Oct. 21, 1947.  C. A. MILLER  2,429,288
FISHING POLE HOLDER
Filed Aug. 22, 1944  3 Sheets-Sheet 1
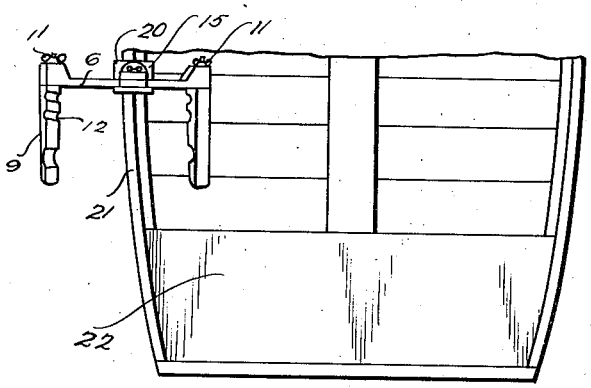
Fig. 1.
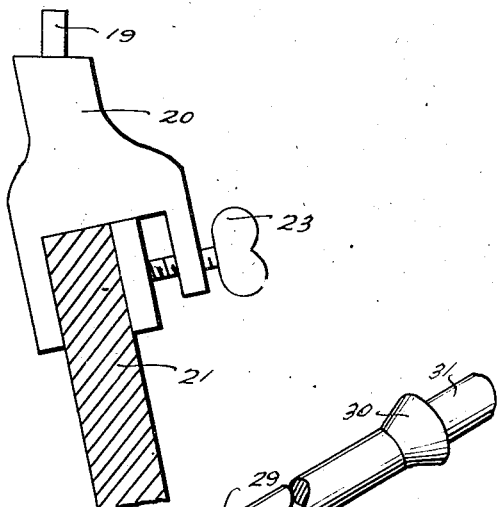
Fig. 2.
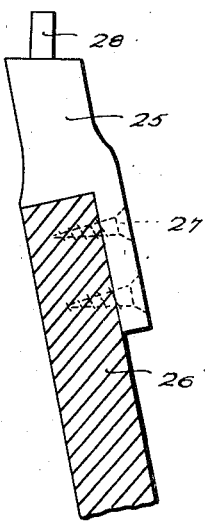
Fig. 3.
Fig. 4.
Inventor
CHANT ALLEN MILLER,
By Clarence A. O'Brien
and Harvey B. Jacobson
Attorneys Oct. 21, 1947.  C. A. MILLER  2,429,288
FISHING POLE HOLDER
Filed Aug. 22, 1944  3 Sheets-Sheet 2

Inventor
CHANT ALLEN MILLER,

By Clarence A. O'Brien
and Harvey B. Jacobson
Attorneys

Oct. 21, 1947.                C. A. MILLER                    2,429,288
                            FISHING POLE HOLDER
                        Filed Aug. 22, 1944              3 Sheets-Sheet 3
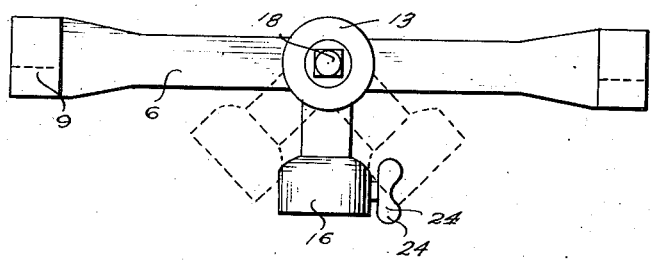
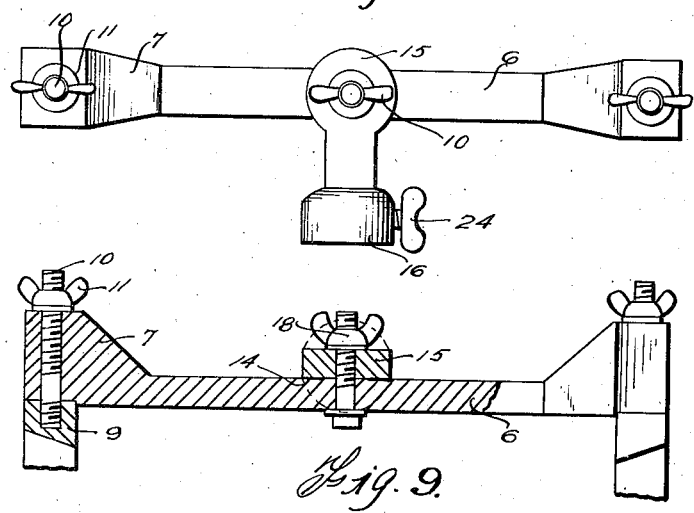
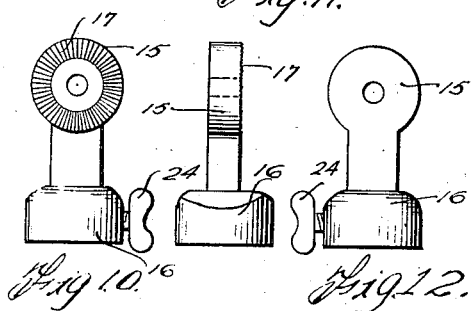
Inventor
CHANT ALLEN MILLER,
By Clarence A. O'Brien
and Harvey B. Jacobson
Attorneys Patented Oct. 21, 1947

2,429,288

UNITED STATES PATENT OFFICE 2,429,288

FISHING POLE HOLDER

Chant Allen Miller, Winamac, Ind.

Application August 22, 1944, Serial No. 550,598

1 Claim. (Cl. 248—42)

The present invention relates to new and useful improvements in holders for fishing poles and the invention has for its primary object to provide a device of this character adapted for easily attaching to and removed from the gunwale of a boat and embodying means for adjusting the pole in any desired position.

A further important object of the invention is to provide a fishing pole holder of this character including a socket member adapted for rotatably supporting the holder for horizontal swinging movement on the upper end of a pin which may be attached to the gunwale of a boat, or embedded in the ground, or supported in any other desired position.

A still further object is to provide a device of this character of simple and practical construction, which is neat and attractive in appearance, efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary top plan view of a boat showing the fishing pole holder in position thereon.

Figure 2 is a fragmentary sectional view through the gunwale of the boat showing the clamping device for the supporting pin of the holder.

Figure 3 is a similar view of a modified form of supporting device.

Figure 4 is a perspective view of a spike adapted for driving into the bank of a stream and having a pin at its upper end for rotatably supporting the holder.

Figure 7 is an end elevational view of the holder looking toward the horizontal pole supporting arms.

Figure 8 is a similar view showing the opposite side of the holder.

Figure 9 is a fragmentary top plan view with parts broken away and shown in section.

Figure 10 is a side elevational view of the socket for the holder and showing the teeth on the clamping head of the socket.

Figure 11 is a similar view showing an edge elevational view of the clamping head of the socket, and Figure 12 is a similar view showing the rear of the head of the socket.

Figure 5:
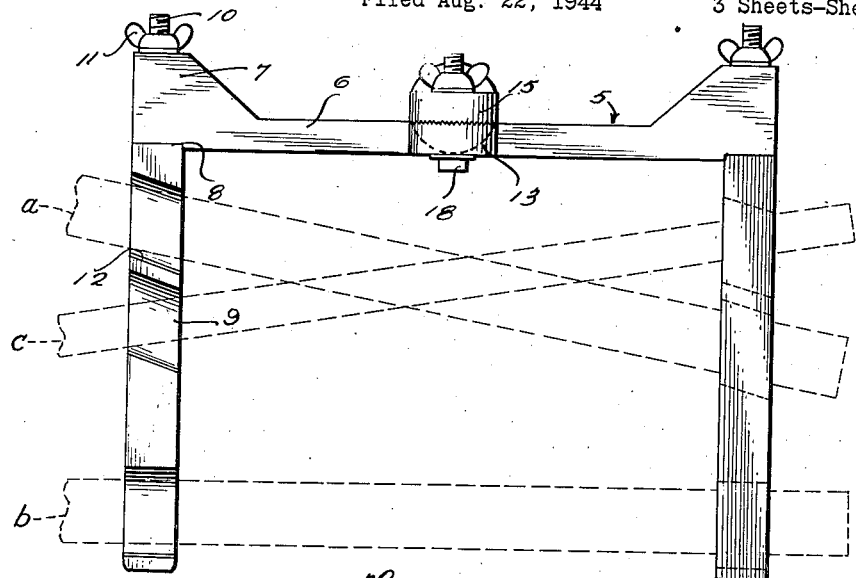
Figure 5 is a top plan view of the holder.
Figure 6:
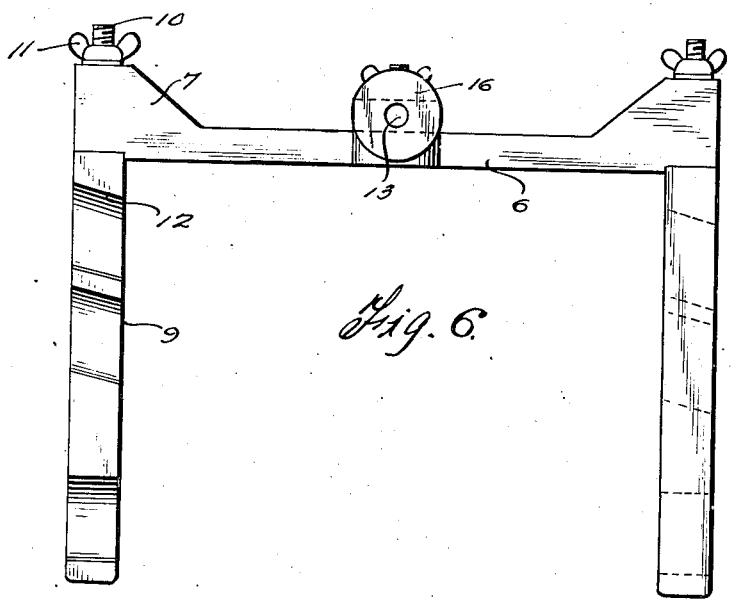
Figure 6 is a bottom plan view thereof.

Referring now to the drawings in detail wherein for the purpose of illustration I have disclosed a preferred embodiment of the invention, the numeral 5 designates the fishing pole holder generally which includes a horizontal bar 6 having its ends enlarged as at 7 at one longitudinal edge of the bar, the opposite longitudinal edge of the bar being rabbeted as shown at 8 for receiving one end of a pair of arms 9 extending in spaced parallel relation to each other from the bar 6. The arms 9 are formed with threaded stems 10 at their inner ends inserted through the enlargement 7 of the bar 6 and secured in position therein by wing nuts 11.

Each of the arms 9 are formed with transversely extending grooves 12 adapted to accommodate a fishing pole (not shown), the arms being supported in a horizontal position, in a manner to be presently described, and with the grooves 12 of one of the arms uppermost to form a seat for the pole and the grooves of the other arm being disposed lowermost with the handle of the pole being positioned in the grooves under said arm.

The intermediate portion of the bar 6 is provided with a flat disk-like formation 13 having teeth or serrations 14 formed on the surface thereof and against which is positioned the flat circular head 15 formed on the upper end of a socket 16. The head 15 is also formed with radially extending teeth or serrations in facing contact with the teeth 14 of the formation 13 and held in engagement therewith by a bolt and wing nut 18 inserted through the head 15 and formation 13 of the bar. The bar may thus be secured in a desired adjusted position with respect to the socket 16 as shown to advantage in Figure 7 of the drawings.

The socket 16 is adapted for receiving a pin 19 projecting upwardly from a clamping member 20 adapted for securing to the upper edge of a gunwale 21 of a boat 22 by means of a bolt and wing nut 23. The socket 16 may be secured in a desired adjusted position on the pin 19 by means of a bolt and wing nut 24, the socket thus being adapted for horizontal rotary movement.

In Figure 3 of the drawings, I have illustrated a modified form of supporting member for the fishing pole holder and comprises a block 25 adapted for securing to the gunwale 26 of the boat by means of screws 27, the block 25 having the pin 28 projecting upwardly therefrom for receiving the socket 16 of the holder.

Also, if desired, the holder may be supported by means of a spike 29 adapted for driving in the ground adjacent the bank of a stream, the spike having a flange 30 adjacent its upper end and above which projects the pin 31 for receiving the socket 16 of the holder.

It will also be understood that the clamps 20 or 25 may be secured to the back of the boat, or to any other desired part thereof.

It will be apparent that any desired number of the grooves 12 may be formed in the arms 9, certain of which may be at right angles to the arms and others inclined, so that one or more fishing poles may be held by the arms in a desired position. As shown in dotted lines in Figure 5 a pole $a$ may be laid obliquely over one arm 9 in an inclined groove 12 thereof with its handle end under the other arm 9 and bearing upwardly in an inclined groove 12 thereof; a pole $b$ may be similarly positioned over and under said arms 9 in opposite right angled grooves 12 in said arms, or a pole $c$ of smaller diameter may be positioned over and under said arms 9 in inclined grooves 12 so that the pole $a$ extends obliquely across said arms 9. The pole $b$ extends at a right angle across said arms and the pole $c$ extends obliquely across the arms oppositely relative to the pole $a$. The grooves 12 in which the poles rest are sufficiently deep to hold said poles in position under downward and lateral pull of a line, or lines, in ordinary fishing, it being understood that said poles are overbalanced on the arm over which the same extends, to cause the handle ends to bear upwardly against the other arm. Additional holders may also be placed on both sides of the boat, if desired.

It is believed that the details of construction and manner of use of the device will be readily understood from the foregoing without further detailed explanation.

Having thus described the invention, what I claim is:

A fish pole holder comprising a member adapted for clamping on an edge of a boat, a pin fixed to and rising from the member, a socket mounted for rotation on the pin for swinging about a vertical axis, means for securing the socket in its rotatably adjusted position, a vertically extending flathead on the socket, a bar pivotally attached intermediate its ends to the head, means securing the bar in pivotally adjusted position, and spaced parallel arms extending from the ends of the bar and adapted to receive a fish pole on top of one arm and under the other arm.

CHANT ALLEN MILLER.

REFERENCES CITED

The following references are of record in the file of this patent:

UNITED STATES PATENTS

| Number | Name | Date |
| --- | --- | --- |
| 1,275,928 | Huppertz | Aug. 13, 1918 |
| 2,130,650 | Peterson | Sept. 20, 1938 |
| 473,073 | Lemaire | Apr. 10, 1892 |
| 1,619,152 | Nunlist | Mar. 1, 1927 |
| 2,341,065 | White | Feb. 8, 1944 |